United States Patent
Schueler et al.

(10) Patent No.: US 9,739,368 B2
(45) Date of Patent: Aug. 22, 2017

(54) METHOD AND DEVICE FOR MONITORING A DRIVE OF A MOTOR VEHICLE

(71) Applicant: Robert Bosch GmbH, Stuttgart (DE)

(72) Inventors: Matthias Schueler, Steinheim (DE); Volker Gilgenbach, Ludwigsburg (DE); Magnus Oppelland, Stuttgart (DE); Dirk Wagner, Pfinztal (DE)

(73) Assignee: ROBERT BOSCH GMBH, Stuttgart (DE)

( * ) Notice: Subject to any disclaimer, the term of this patent is extended or adjusted under 35 U.S.C. 154(b) by 228 days.

(21) Appl. No.: 14/485,989

(22) Filed: Sep. 15, 2014

(65) Prior Publication Data

US 2015/0081183 A1  Mar. 19, 2015

(30) Foreign Application Priority Data

Sep. 16, 2013  (DE) .................. 10 2013 218 504

(51) Int. Cl.
| | |
|---|---|
| *B60W 30/18* | (2012.01) |
| *F16H 61/02* | (2006.01) |
| *B60W 10/04* | (2006.01) |
| *B60W 10/10* | (2012.01) |
| *F16H 59/18* | (2006.01) |
| *F16H 61/12* | (2010.01) |

(52) U.S. Cl.
CPC ......... *F16H 61/0202* (2013.01); *B60W 10/04* (2013.01); *B60W 10/10* (2013.01); *B60W 30/18* (2013.01); *B60W 2510/18* (2013.01); *B60W 2520/105* (2013.01); *B60W 2710/0616* (2013.01); *B60W 2710/083* (2013.01); *B60W 2710/1005* (2013.01); *F16H 59/18* (2013.01); *F16H 2061/1208* (2013.01)

(58) Field of Classification Search
None
See application file for complete search history.

(56) References Cited

U.S. PATENT DOCUMENTS

| | | | | |
|---|---|---|---|---|
| 5,212,640 A | * | 5/1993 | Matsuda | B60G 17/0185 180/197 |
| 8,401,757 B2 | * | 3/2013 | Tokimasa | B60T 7/18 701/70 |
| 2002/0107106 A1 | * | 8/2002 | Kato | B60K 31/0008 477/110 |
| 2003/0109969 A1 | * | 6/2003 | Yamaguchi | B60K 6/485 701/22 |
| 2011/0071726 A1 | * | 3/2011 | Bechtler | B60T 8/3685 701/29.2 |

(Continued)

FOREIGN PATENT DOCUMENTS

| | | |
|---|---|---|
| DE | 44 38 714 | 5/1996 |
| DE | 10 2011 075609 | 11/2012 |

*Primary Examiner* — Justin Holmes
(74) *Attorney, Agent, or Firm* — Norton Rose Fulbright US LLP; Gerard Messina

(57) ABSTRACT

A method for the safe operation of a drive of a motor vehicle, the drive being controlled by at least one control unit, including acceleration monitoring in which the allowability of an operating state of the drive results as a function of a comparison of an ascertained actual acceleration with an allowable acceleration, a fault response being initiated as a function of whether a braking request is present, if the comparison shows that an inadvertent acceleration is present.

20 Claims, 3 Drawing Sheets

(56) References Cited

U.S. PATENT DOCUMENTS

2012/0062375 A1* 3/2012 Takeuchi ............ B60W 50/085
340/441
2012/0290187 A1* 11/2012 Oesterreicher ... B60W 50/0205
701/99

* cited by examiner

METHOD AND DEVICE FOR MONITORING
A DRIVE OF A MOTOR VEHICLE

RELATED APPLICATION INFORMATION

The present application claims priority to and the benefit of German patent application no. 10 2013 218 504.9, which was filed in Germany on Sep. 16, 2013, the disclosure of which is incorporated herein by reference.

FIELD OF THE INVENTION

The present invention relates to a method for monitoring a drive of a motor vehicle. In other aspects, the present invention relates to a computer program for carrying out this method, an electronic storage medium, and a control unit.

BACKGROUND INFORMATION

An acceleration-based method for monitoring the safety of a drive is discussed in DE 10 2011 075 609 A1. Here, a setpoint torque is calculated in a safety function as a function of an accelerator pedal signal characteristic for the position of the accelerator pedal. An expected vehicle acceleration is determined in the safety function as a function of the setpoint torque. In addition, an actual vehicle acceleration is determined, for example, with the aid of an acceleration sensor. A fault situation may be detected by comparing the actual vehicle acceleration and the expected vehicle acceleration.

A method for controlling the drive power of a vehicle is discussed in DE 44 38 714 A1, only one microcomputer being provided for carrying out control functions and monitoring functions. In the microcomputer, at least two levels are established which are independent of each other, a first level carrying out the control functions and a second level carrying out the monitoring functions.

SUMMARY OF THE INVENTION

If a method for the safe operation of a drive of a motor vehicle, the drive being controlled by at least one control unit (1), is carried out in such a way that it includes acceleration monitoring, it is advantageous for an intended safe operation of the drive that if the acceleration monitoring shows that an inadvertent acceleration is present, a fault response is selected and initiated as a function of whether a braking request is present.

The term "braking request" is to be understood to be broadly worded. It includes a braking request by a driver of the motor vehicle as well as braking requests generated, for example, by an assistance system of the motor vehicle. It is irrelevant whether or not the braking system has already transmitted a braking force to a wheel of the motor vehicle.

Acceleration monitoring is, for example, a monitoring method as discussed, for example, in DE 10 2011 075 609 A1, in which the allowability of an operating state of the drive results as a function of a comparison of an ascertained actual acceleration with an allowable acceleration. If this comparison shows that the ascertained actual acceleration is greater than the allowable acceleration, it is stated below that a state of "inadvertent acceleration" exists. If this case exists, the difference formed from the actual acceleration minus the allowable acceleration is also referred to as "inadvertent acceleration," the distinction being clear from the particular context.

In one advantageous aspect of the present invention, if the braking request is present, the fault response is initiated as a function of whether a fault is present in an electric machine of the drive. The electric machine may in particular be an electric machine which is operable as a motor, for example, a starter-generator. As a result of this check of whether a fault is present in the electric machine, the reliability of the method is increased.

In one advantageous refinement of this aspect, if the fault is present in the electric machine, a neutral torque of the electric machine is requested, i.e., a request is transmitted to the electric machine to generate no torque via its electromagnetic drive. The implementation of the neutral torque may advantageously be carried out via an active short circuit of a field coil of the electric machine. The neutral torque may thus ensure that the risk of a dangerous reaction of the electric machine is minimized, and the method becomes particularly safe.

According to another advantageous refinement of this aspect, if the fault is not present in the electric machine, the operation of the electric machine is limited to generator operation, i.e., motor operation of the electric machine is prohibited, and/or an electric braking torque is requested. In this way, it is ensured in a particularly simple manner that the electric machine does not counteract the present braking request, or supports it in a particularly effective manner, thus further increasing the safety of the method.

According to another advantageous refinement, if the fault is not present in the electric machine or the inadvertent acceleration is still present after the neutral torque has been requested of the electric machine in an intrinsically safe manner, a transmission of the drive may be shifted to a lower gear, i.e., the gear ratio of the transmission is minimized in order to increase the drag torque of the internal combustion engine and to support the present braking request in a particularly effective manner. In particular, it may furthermore be provided that if no fault is present in the internal combustion engine or the control unit, the transmission is shifted to a lower gear.

In another advantageous aspect, engine-based actions may be initiated in order to increase the drag torque of the internal combustion engine. Such actions may include an engine brake or an activation of a turbocharger.

In another advantageous aspect, if the inadvertent acceleration is still present after a predefinable time interval has elapsed, a check of the allowability of the operating state is carried out using alternative monitoring instead of the acceleration monitoring. This has the advantage that, for example, in cases in which an actual acceleration which is, for example, too large, is erroneously detected due to external circumstances, a complementary check of the allowability of the operating state is carried out via the alternative monitoring. As a result, the method is more reliable.

According to another advantageous aspect of the present invention, if no braking request is present, the fault response is carried out as a function of whether an external force effect has been detected. The reliability of the method is thus increased, since it is possible to react appropriately to situations in which an accident is present, or in which no accident is present.

A detection of the external force effect may, for example, result from a sensing of an accident by an airbag control unit.

In one possible refinement of this aspect, if the external force effect has been detected, a braking request is transmitted to a brake of the motor vehicle, and/or a request is transmitted to an injector control to inject no fuel, and/or an electric braking torque is requested of an electric machine. As a result of these actions, safety is increased in particular in accident situations.

In another possible refinement, if no external force effect has been detected, the fault response is carried out as a function of whether the inadvertent acceleration is greater than a predefinable threshold value. In this way, it is possible to assess the criticality of the situation in a particularly simple manner and to react appropriately.

According to another refinement of this aspect, if the inadvertent acceleration is greater than the predefinable threshold value, a reset of control software of the control unit is carried out. In this way, a malfunction of the control unit may be particularly effectively remedied by the reinitialization of the control unit following the reset, without greatly inconveniencing the driver.

According to another refinement, if the inadvertent acceleration is greater than the predefinable threshold value, and if the inadvertent acceleration is still present after a second predefinable period, a deactivation of an injection system of an internal combustion engine of the drive and a deactivation of at least one communication interface of the control unit are carried out. This measure may be carried out in a particularly simple manner via a so-called watchdog deactivation. A watchdog, which transmits messages to the control unit for testing and receives responses from the control unit, triggers the deactivation. As a result of the deactivation of the communication interface, for example, a CAN bus, other components of the drive no longer receive messages from the control unit, and they subsequently go into safe emergency operation. As a result of the deactivation of the injection system, i.e., in particular as a result of the (hardware) deactivation of the injector control, an inadvertent acceleration via the internal combustion engine is effectively prevented. As a result of these actions, responses are made to particularly critical faults in a particularly effective manner.

According to another aspect of the present invention, it may be provided that if the inadvertent acceleration is not greater than the predefinable threshold value, i.e., if the malfunction of the drive is not very serious, but the inadvertent acceleration is still present after a third predefinable period, a check of the allowability of the operating state is carried out using the alternative monitoring instead of the acceleration monitoring. This has the advantage that, for example, in cases in which an actual acceleration which is, for example, too large, is erroneously detected due to external circumstances, a complementary check of the allowability of the operating state is carried out via the alternative monitoring. As a result, the method is more reliable.

According to another aspect of the present invention, if the inadvertent acceleration is not greater than the predefinable threshold value, and if a fault is present in an electric machine, a neutral torque of the electric machine is requested. In this way, an inadvertent acceleration may be prevented via the electric machine in a particularly simple manner which is comfortable for the driver.

According to one further aspect, if the inadvertent acceleration is still present after a fourth predefinable period, the allowability of the operating state is checked using the alternative monitoring instead of the acceleration monitoring. This has the advantage that, for example, in cases in which an actual acceleration which is, for example, too large, is erroneously detected due to external circumstances, a complementary check of the allowability of the operating state is carried out via the alternative monitoring. As a result, the method is more reliable.

In other aspects, the alternative monitoring described above may be provided via rotational speed monitoring. In rotational speed monitoring, the allowability of the operating state is assessed as a function of whether an actual rotational speed of the internal combustion engine (for example, the rotational speed of the crankshaft) exceeds a permitted allowable engine rotational speed.

In another aspect, the present invention relates to a computer program which is configured to carry out all steps of one of the described methods.

In another aspect, the present invention relates to an electronic storage medium on which this computer program is stored.

In another aspect, the present invention relates to a control unit which has such an electronic storage medium.

The figures show particularly advantageous specific embodiments of the present invention.

DETAILED DESCRIPTION

Figure 1:
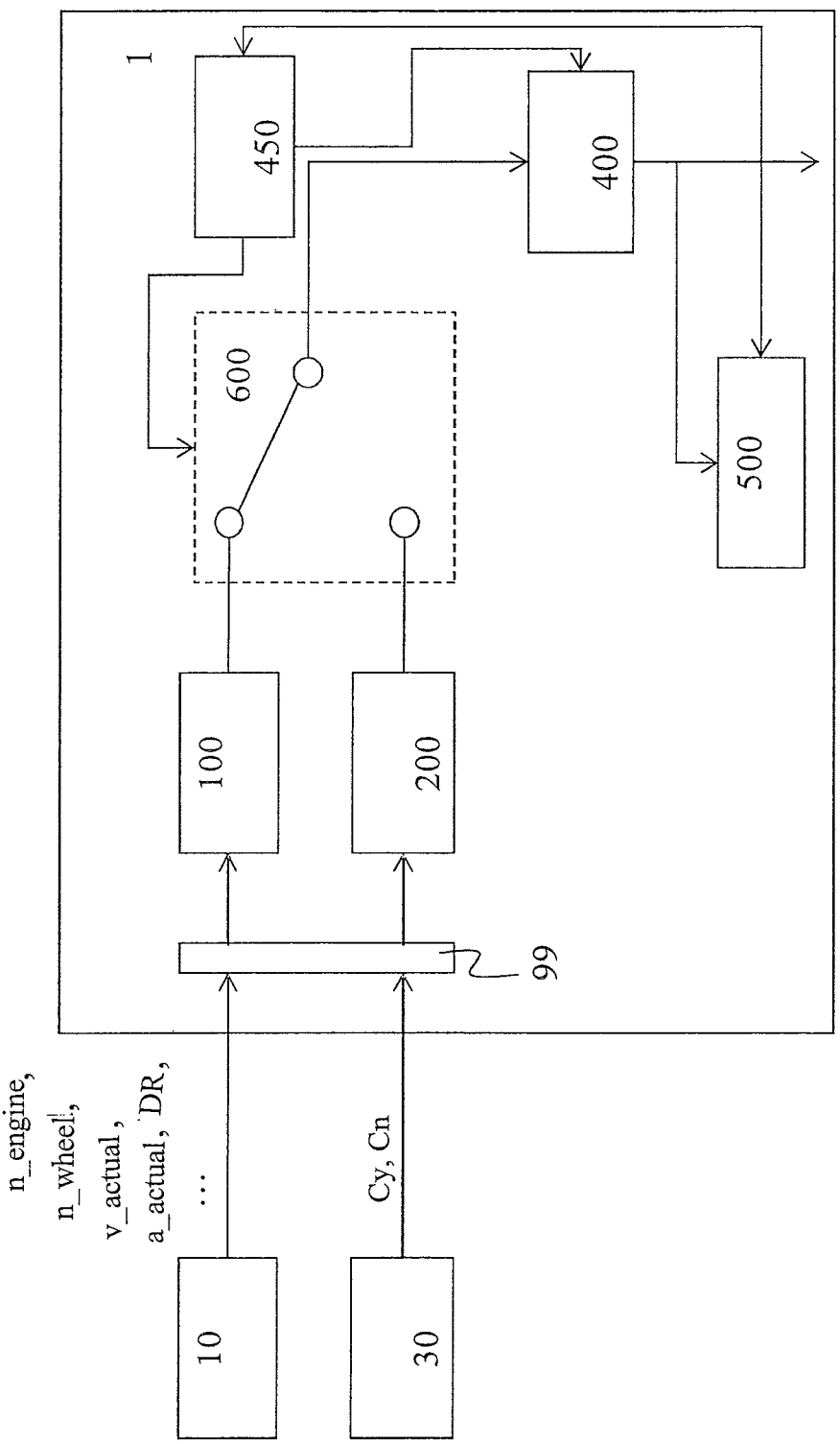
FIG. 1 schematically depicts information flows in the control unit according to a first aspect of the present invention.

FIG. 1 schematically depicts the structure of a device which is able to carry out the monitoring method. FIG. 1 depicts a control unit 1, for example, an engine control unit, which controls an engine of the motor vehicle. Control unit 1 receives data from external devices via an interface 99. For example, sensors which are installed in a drive train 10 transmit a rotational speed n_engine of a crankshaft of the engine (instead of rotational speed n of the crankshaft, a different rotational speed may also be taken which characterizes the actual rotational speed of the engine, for example, a rotational speed of a camshaft) and/or a rotational speed n_wheel of one wheel or multiple wheels of the motor vehicle and/or an actual velocity v_actual of the motor vehicle and/or an actual acceleration a_actual of the motor vehicle and/or a driver request DR which, for example, is ascertained from a degree of actuation of an accelerator pedal. Driver request DR may, for example, be normalized to values between 0 (accelerator pedal not actuated) and 1 (accelerator pedal fully actuated). A torque intended by the driver may then be ascertained from this driver request DR.

However, instead of detection using sensors, it is also possible that some or all of these variables are ascertained indirectly, for example, that they are also ascertained within control unit 1.

An airbag control unit 30 transmits a signal to interface 99 which includes two possible states, i.e., a state Cn which indicates that no collision of the motor vehicle has been detected, and an additional state Cy which indicates that a collision of the motor vehicle has been detected. State Cy thus indicates in this exemplary embodiment that an external force has been detected.

Furthermore, acceleration monitoring 100 and alternative monitoring, here in the form of rotational speed monitoring 200, are configured in control unit 1. Acceleration monitoring 100 and rotational speed monitoring 200 receive as input variables some or all of the variables from interface 99 which interface 99 receives. Acceleration monitoring 100 and rotational speed monitoring 200 have a signal at their outputs which states whether a fault has been detected in the drive train of the motor vehicle by the particular monitoring method. These output signals are transmitted to an evaluation block 400, a switching block 600 being provided in the exemplary embodiment depicted here which receives the output signals of acceleration monitoring 100 and rotational speed monitoring 200 and either transmits the output signal of acceleration monitoring 100 or the output signal of rotational speed monitoring 200 to evaluation block 400, depending on the position of a switch.

In evaluation block 400, the output signals transmitted to it are analyzed and an evaluation signal is fed to an action block 500, which initiates counteractions as a function of the evaluation signal.

Based on the instantaneous operating state of the drive of the motor vehicle, a switching control block 450 decides whether the output signal of acceleration monitoring 100 or the output signal of rotational speed monitoring 200 is transmitted to evaluation block 400, and controls switching block 600 accordingly. Switching control block 450 optionally transmits a signal to evaluation block 400 and to action block 500 which provides information about this control of switching block 600.

Figure 2:
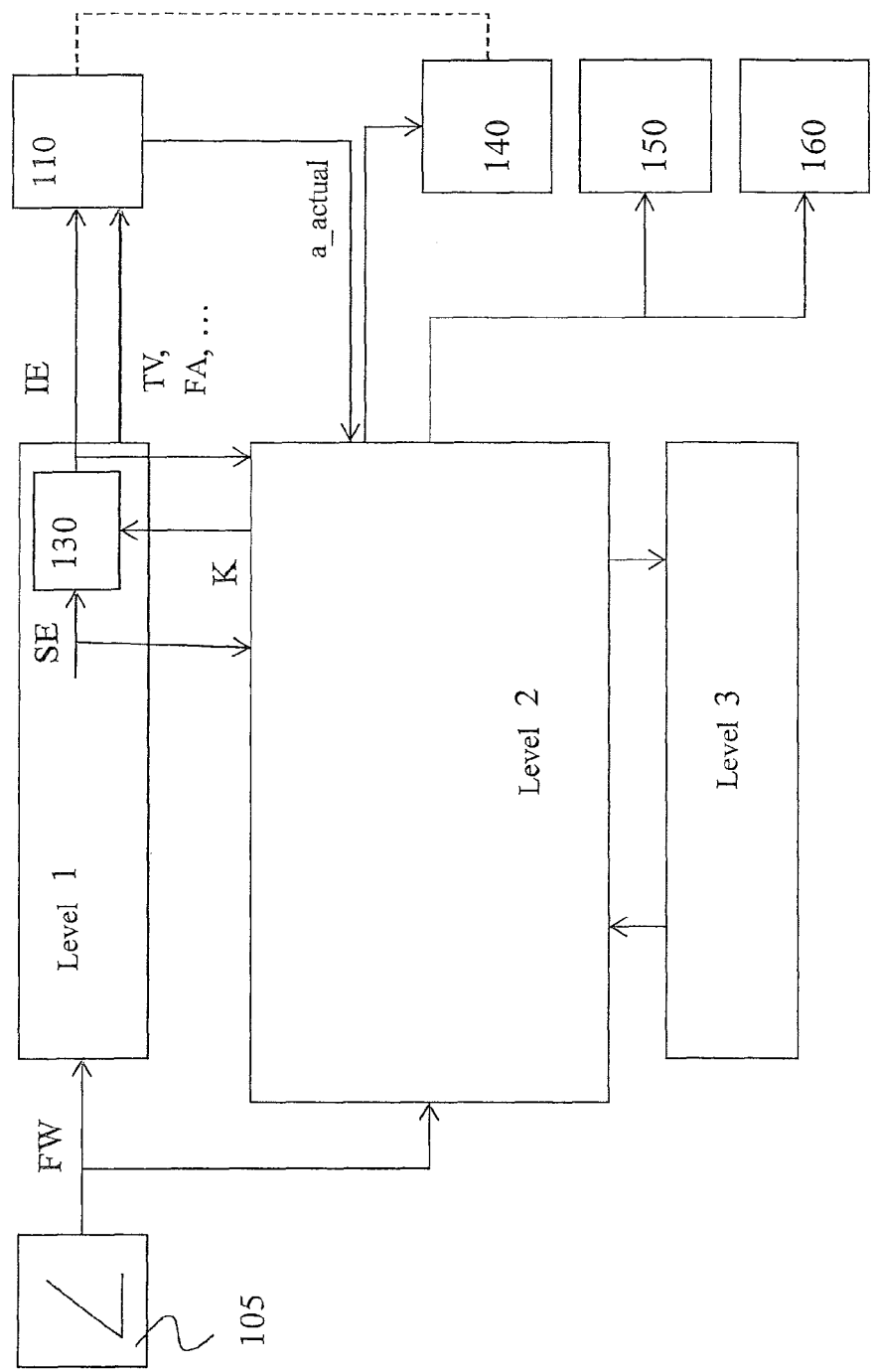
FIG. 2 schematically depicts information flows in the control unit according to a second aspect of the present invention.

FIG. 2 depicts control unit 1 in which the method according to the present invention may run. Control unit 1 receives a driver request DR in a known manner from an accelerator pedal sensor 105, driver request DR, for example, being normalized from 0 (accelerator pedal not actuated) to 1 (accelerator pedal fully actuated). The control unit controls internal combustion engine 110 and electric machine 140.

The first level, level 1, ascertains suitable control variables for internal combustion engine 110 from driver request DR, in particular, degree of opening of the throttle valve TV and firing angle FA, which are transmitted to internal combustion engine 140. The first level also includes injector control 130. In the first level, request SE for injecting fuel is transmitted to injector control 130. From this, injector control 130 ascertains control command IE, which is transmitted to the injectors of internal combustion engine 110 and thus controls the opening and closing of the injectors.

The second level, level 2, which is known to those skilled in the art as the software monitoring level, may intervene directly into injector control 130 of the first level via command CMD, and may prevent injector control 130 from transmitting control command IE to the injectors of internal combustion engine 110 via command CMD. Likewise, the second level may control brake 150 and/or transmission 160, for example, indirectly via separate control units.

The third level, level 3, which is known to those skilled in the art as the hardware monitoring level, includes the watchdog as a hardware component which is separate from control unit 1, which transmits signals to the second level in a known manner, and decides, as a function of response signals which the second level transmits back to the third level, whether a fault is present in the second level, in particular, a hardware fault of control unit 1.

Figure 3:
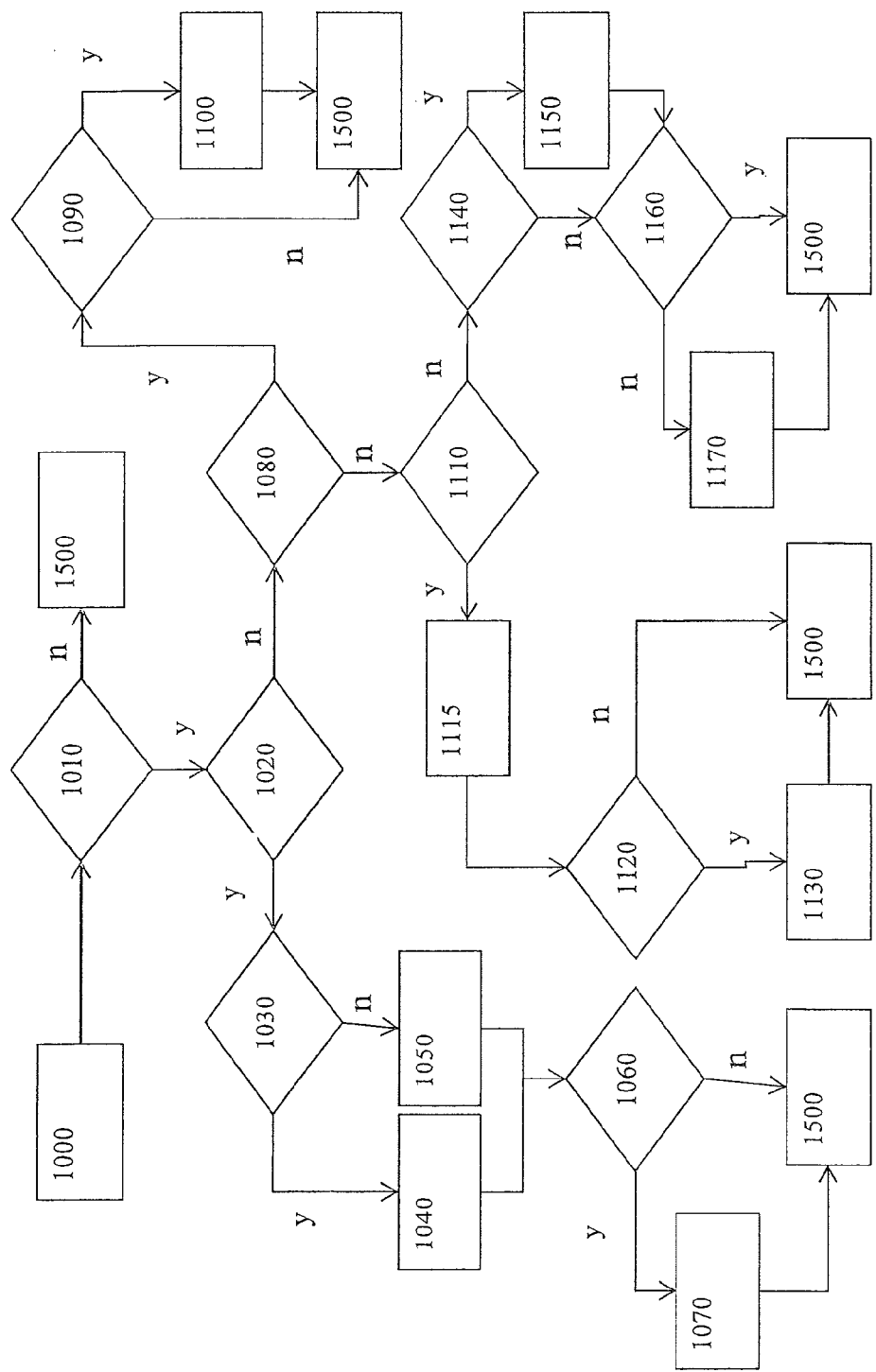
FIG. 3 depicts an exemplary flow chart of the method according to the present invention.

FIG. 3 depicts, by way of example, a flow chart for one specific embodiment of the present invention. The method runs, for example, in control unit 1. The method may be carried out repeatedly, for example, cycle-synchronously with each stroke of the internal combustion engine. The method begins at step 1000. In following step 1010, it is checked whether actual acceleration a_actual is greater than allowable acceleration a_allowable. Allowable acceleration a_allowable is, for example, derived previously from driver request DR.

If actual acceleration a_actual is not greater than allowable acceleration a_allowable, the method ends at step 1500. On the other hand, if actual acceleration a_actual is greater than allowable acceleration a_allowable, step 1020 follows. In step 1020, it is checked whether a braking request is present. As explained above, the term "braking request" is to be understood to be broadly worded. If the braking request is present, optional step 1030 follows. However, it is also possible that branching takes place directly to step 1080.

In step 1030, it is checked whether a detected fault is present in electric machine 140. If this is the case, step 1040 follows. If this is not the case, step 1050 follows. In step 1040, the instruction is transmitted to electric machine 140 to output a neutral torque, i.e., to control electric machine 140 in such a way that it generates no torque (apart from its mechanical inertia and friction). Alternatively, if electric machine 140 is externally excited, an active short circuit of the field coil of electric machine 140 may then be requested. In step 1050, some or all of the following actions are carried out: Transmission 160 may be controlled in such a way that a lower gear is engaged, in order to increase the drag torque of internal combustion engine 110. In addition, an engine brake may be activated if it is present. In electric machine 140, a setpoint torque may be predefined which counteracts, i.e., brakes, the rotary motion of the crankshaft. A limitation may also be transmitted to electric machine 140, that it is to be operated only as a generator, but not as a motor. Step 1060 follows step 1040 or step 1050.

In step 1060, after the predefinable time interval has elapsed, it is checked whether actual acceleration a_actual is still greater than allowable acceleration a_allowable. If this is the case, step 1070 follows. If this is not the case, it is decided that a sufficient response has been made to the fault, and the method ends at step 1500.

In step 1070, a command is transmitted to switching control block 450, to control switching block 600 in such a way that the output signal of rotational speed monitoring 200 is transmitted to evaluation block 400, i.e., the monitoring is switched from acceleration monitoring 100 to rotational speed monitoring 200. The method then ends at step 1500.

On the other hand, if it is detected in step 1020 that the braking request is not present, step 1080 follows. In step 1080, it is checked whether airbag control unit 30 transmits state Cy, i.e., that the effect of external forces has been detected. If this is the case, optional step 1090 follows, or the method ends at step 1500. If state Cy is not transmitted by airbag control unit 30, step 1110 follows.

In step 1090, it is checked whether a predefinable additional condition is met, for example, that actual velocity v_actual is lower than a predefinable velocity threshold value. However, the predefinable additional condition may also be selected in such a way that it is always met. If the predefinable additional condition is met, step 1100 follows; otherwise, the method ends at step 1500. In step 1100, some or all of the following steps are carried out: A command for brake intervention may be transmitted to brake 150. A setpoint torque may be transmitted to electric machine 140 which counteracts, i.e., brakes, the rotary motion of the crankshaft. Request SE for injecting fuel may also be carried out in such a way that no fuel is injected, i.e., a software injection suppression is carried out. After step 1100, the method ends at step 1500.

In step 1110, it is checked whether the difference of actual acceleration a_actual minus allowable acceleration a_allowable is greater than predefinable threshold value Delta_a. If this is the case, optional step 1115 follows, in which a reset of the control software of control unit 1 is carried out. Step 1120 then follows, or follows directly after step 1110. In step 1120, after the second predefinable period, it is checked whether the unallowable acceleration is still present, i.e., whether the actual acceleration is still greater than allowable acceleration a_allowable. If this is not the case, the method ends at step 1500. On the other hand, if actual acceleration a_actual is still greater than allowable acceleration a_allowable after the second predefinable time period, step 1130 follows.

In step 1130, fault detection via the watchdog monitoring of the third level is triggered. Triggering (for example, via a change in a transmitted message) takes place, so that a decision is made within the scope of the watchdog monitoring that a fault is present. As a result, a hardware deactivation of injector control 130 is carried out and no further injection into internal combustion engine 110 may be carried out. The communication interfaces, for example, the CAN bus, to other components of the drive are also optionally deactivated. The method then ends at step 1500.

On the other hand, if it is not detected in step 1110 that actual acceleration a_actual does not exceed allowable acceleration a_allowable by at least predefinable threshold value Delta_a, step 1140 optionally follows, or step 1160 follows directly. In step 1140, it is checked whether it has been detected that a fault is present in electric machine 140. If this is not the case, step 1160 follows. Otherwise, step 1150 follows, in which a neutral torque is requested of electric machine 140, or an active short circuit of the field coil of electric machine 140 is carried out. Step 1160 then follows.

In step 1160, after the predefinable third period, it is checked whether the acceleration fault is still present, i.e., whether actual acceleration a_actual is still greater than allowable acceleration a_allowable. If this is not the case, the method ends at step 1500. Otherwise, step 1170 follows. In step 1170, a command is transmitted to switching control block 450, to control switching block 600 in such a way that the output signal of rotational speed monitoring 200 is transmitted to evaluation block 400, i.e., the monitoring is switched from acceleration monitoring 100 to rotational speed monitoring 200. Otherwise, the method ends at step 1500.

Here, it is also possible that the third period in step 1160 is chosen to have a different length, depending on whether branching to step 1160 takes place from step 1140 or step 1150. In this case, in the case of branching from step 1150 to step 1160 after the fourth predefinable period elapses, it is checked whether the unallowable acceleration is still present.

It is to be understood for those skilled in the art that all components and signals described here may be implemented in software; or they may also be implemented completely as hardware, or they may also be implemented partially as hardware and partially as software.

What is claimed is:

1. A method for providing safe operation of a drive of a motor vehicle, the drive being controlled by at least one control unit, the method comprising:
    providing acceleration monitoring, in which allowability of an operating state of the drive results as a function of a comparison of an ascertained actual acceleration with an allowable acceleration; and
    selecting, when the comparison shows that an inadvertent acceleration is present, a fault response out of a plurality of fault responses comprising one or more processes implemented by the at least one control unit to modify the operating state of the drive from inadvertent acceleration to allowable acceleration,
    wherein the at least one control unit selects a fault response when a braking request is present and a different fault response when a braking request is not present.

2. The method of claim 1, wherein, when the braking request is present, the at least one control unit selects one type of fault response when a fault is present in an electric machine of the drive and a different type of fault response when the fault is not present in the electric machine of the drive.

3. The method of claim 2, wherein, when the fault is present in the electric machine, a neutral torque of the electric machine is requested.

4. The method of claim 2, wherein, when the fault is not present in the electric machine, the at least one control unit performs one or more of limiting the operation of the electric machine to generator operation and requesting an electric braking torque.

5. The method of claim 2, wherein, when the fault is not present in the electric machine, a transmission of the drive is shifted to a lower gear.

6. The method of claim 2, wherein, when the fault is not present in the electric machine and no fault is present in an internal combustion engine or the control unit, an engine drag torque is increased, in particular via an engine brake or a control of a turbocharger.

7. The method of claim 2, wherein, when the fault is not present in the electric machine and when no fault is present in an internal combustion engine of the drive or in the control unit, a transmission of the drive is shifted to a lower gear.

8. The method of claim 1, wherein, when the inadvertent acceleration is still present after a predefinable time interval has elapsed, the allowability of the operating state is checked using rotational speed monitoring instead of the acceleration monitoring.

9. The method of claim 1, wherein, when no braking request is present, the at least one control unit selects one type of fault response when an external force effect has been detected and a different type of fault response when an external force effect has not been detected.

10. The method of claim 9, wherein, when the external force effect has been detected, the at least one control unit performs one or more of transmitting a braking request to a brake of the motor vehicle, transmitting a request to an injector valve control to inject no fuel, and requesting an electric braking torque of an electric machine.

11. The method of claim 9, wherein, when no external force effect has been detected, the at least one control unit selects one type of fault response when the inadvertent acceleration is greater than a predefinable threshold value and a different type of fault response when the inadvertent acceleration is not greater than the predefinable threshold value.

12. The method of claim 11, wherein, when the inadvertent acceleration is greater than the predefinable threshold value, a reset of control software of the control unit is carried out.

13. The method of claim 11, wherein, when the inadvertent acceleration is greater than the predefinable threshold value, and when the inadvertent acceleration is still present after a second predefinable period, a deactivation of an injection system of an internal combustion engine of the drive is carried out.

14. The method of claim 11, wherein, when the inadvertent acceleration is not greater than the predefinable threshold value, but the inadvertent acceleration is still present after a third predefinable period, the allowability of the operating state is checked using rotational speed monitoring instead of the acceleration monitoring.

15. The method of claim 11, wherein, when the inadvertent acceleration is not greater than the predefinable threshold value, and when a fault is present in an electric machine, a neutral torque of the electric machine is requested.

16. The method of claim 15, wherein, when the inadvertent acceleration is still present after a fourth predefinable period, the allowability of the operating state is checked using rotational speed monitoring instead of the acceleration monitoring.

17. The method of claim 11, wherein, when the inadvertent acceleration is greater than the predefinable threshold value, and when the inadvertent acceleration is still present after a second predefinable period, a deactivation of an injection system of an internal combustion engine of the drive is carried out and a deactivation of at least one communication interface of the control unit is carried out.

18. A computer readable medium having a computer program, which is executable by a processor, comprising:
a program code arrangement having program code for providing safe operation of a drive of a motor vehicle, the drive being controlled by at least one control unit, by performing the following:
providing acceleration monitoring, in which allowability of an operating state of the drive results as a function of a comparison of an ascertained actual acceleration with an allowable acceleration; and
selecting, when the comparison shows that an inadvertent acceleration is present, a fault response out of a plurality of fault responses comprising one or more processes implemented by the at least one control unit to modify the operating state of the drive from inadvertent acceleration to allowable acceleration,
wherein the at least one control unit selects a fault response when a braking request is present and a different fault response when a braking request is not present.

19. The computer readable medium of claim 18, wherein, when the braking request is present, the at least one control unit selects one type of fault response when a fault is present in an electric machine of the drive and a different type of fault response when the fault is not present in the electric machine of the drive.

20. A control unit, comprising:
an electronic storage medium having a computer program, which is executable by a processor, including a program code arrangement having program code for providing safe operation of a drive of a motor vehicle, the drive being controlled by at least one control unit, by performing the following:
providing acceleration monitoring, in which allowability of an operating state of the drive results as a function of a comparison of an ascertained actual acceleration with an allowable acceleration; and
selecting, when the comparison shows that an inadvertent acceleration is present, a fault response out of a plurality of fault responses comprising one or more processes implemented by the at least one control unit to modify the operating state of the drive from inadvertent acceleration to allowable acceleration,
wherein the at least one control unit selects a fault response when a braking request is present and a different fault response when a braking request is not present.

* * * * *